Dec. 22, 1959     B. SCHENKER ET AL     2,918,633
ENCASED ELECTRIC FILTER
Filed Feb. 23, 1955
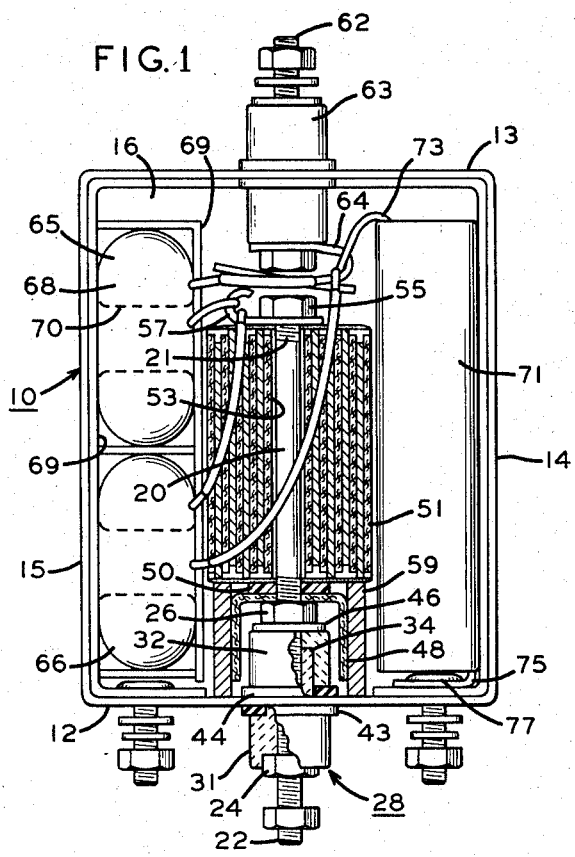
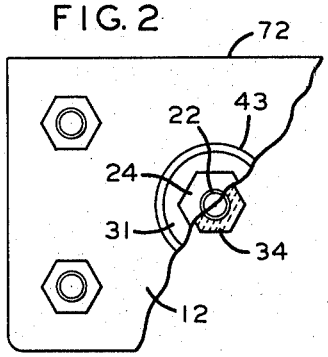
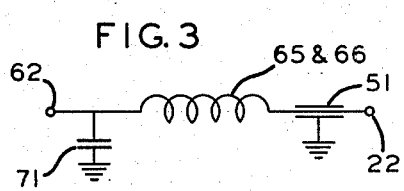
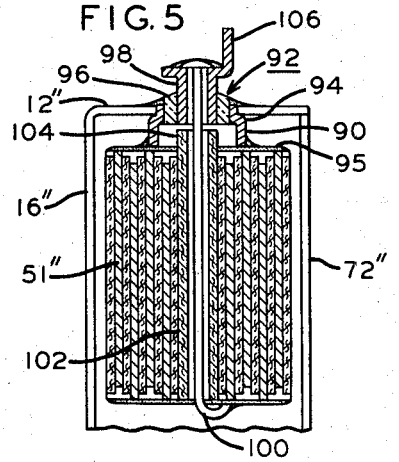
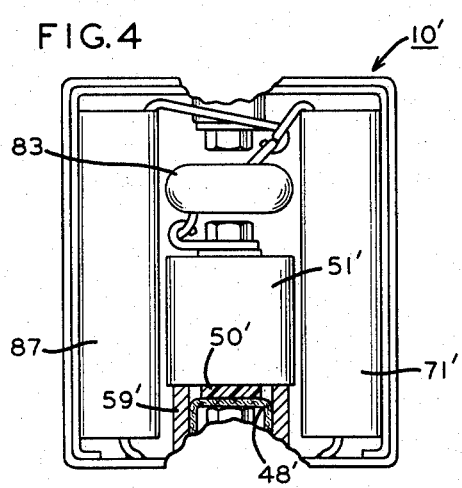
BERNARD SCHENKER
RICHARD W. LORD
JOHN CAMPBELL
*INVENTORS.*
BY *Connolly and Hutz*
THEIR ATTORNEYS

United States Patent Office 2,918,633
Patented Dec. 22, 1959

2,918,633

ENCASED ELECTRIC FILTER

Bernard Schenker, Williamstown, Richard W. Lord, Berkshire, Mass., and John P. Campbell, Stamford, Vt., assignors to Sprague Electric Company, North Adams, Mass., a corporation of Massachusetts Application February 23, 1955, Serial No. 490,011

1 Claim. (Cl. 333—70)

The present invention relates to encased electric filter assemblies, and more particularly to the type of assembly used in current supply circuits where electric current is to be delivered free, or substantially free, of undesired high frequency disturbances.

Among the objects of the present invention is the provision of novel assemblies of the above type which are simpler to construct and more compact.

The above as well as additional objects of the present invention will be more clearly understood from the following description of several of its exemplifications, reference being made to the accompanying drawings wherein:

Fig. 1 is a plan view, partly in section, of a filter assembly according to the present invention;

Fig. 2 is a partly broken away end view of the construction of Fig. 1;

Fig. 3 is a schematic diagram illustrating the electrical operation of the construction of Fig. 1;

Fig. 4 is a view similar to Fig. 1 with a modified form of filter assembly constructed in accordance with the present invention; and Fig. 5 is a sectional detail view of a further modification pursuant to the present invention.

A feature of the present invention is that a very compact and effective type of filter assembly is provided using a generally rectangular electrically conductive housing with end and side walls, a generally cylindrical filter capacitor with an axial feed-through lead positioned adjacent an end wall of the housing, the feed-through lead being perpendicular to said end wall and having an extension penetrating through but insulated from said end wall, and a pair of additional filter members positioned on opposite sides of said capacitor between the capacitor and the opposing side walls of the housing.

In this way a relatively small rectangular housing will accommodate all components of the filter assembly and good filtering is obtained. For maximum compactness the additional filter members in the housing can be of generally rectangular cross-section.

Somewhat better filtering performance is also obtainable where the filter capacitor has a soldered-together convolutely wound electrode edge facing a housing wall and encircling the projecting feed-through conductor, and a conductive spacer ring electrically connects the soldered edge with the wall but spaces it from the wall to improve the insulation between the feed-through conductor and the soldered edge.

It has also been found that a pi-type filter having a series inductance with shunt capacitances at both ends will give very satisfactory results when only one of the capacitors is of the so-called "feed-through" type (with an axially penetrating lead), the other capacitance being provided by a convolutely wound extended-foil construction non-inductively connected, but located beside rather than around the supply conductor.

Fig. 1 of the drawings shows an embodiment of the present invention housed in a "bathtub" type of casing 10, which is shown with the cover removed. The housing 10 has end walls 12 and 13, side walls 14 and 15, and bottom wall 16, generally rectangularly disposed and pressed for example from an integral sheet of metal so that there are no seams or joints. Through end wall 12 there projects a rod 20 threaded along most of its length from one end 22, and also threaded at the other end as indicated at 21. Adjacent end 22 a collar 24 can be an integral part of the rod or alternatively can be a separate ring welded, threaded or otherwise securely held in place. The rod 20 is clamped to wall 12 in an insulated manner by means of a nut 26 threaded on the rod and tightly clamping an insulator bushing 28 against collar 24. The bushing 28 in turn is made of two principal parts 31 and 32 between which the wall 12 is sandwiched, part 31 including an extension or skirt 34 of reduced width that penetrates through the wall and is received in a socket 36 formed in part 32.

The parts 31 and 32 of the insulator 28 can be cushioned against each other as well as against the collar 24 and wall 12, as by means of rubbery glands or washers 43 and 44. A washer 46 can also be interposed underneath the nut 26.

Around the internally projecting portion of the insulator 28 as well as the nut 26 there is shown positioned an insulating cup 48 which can be made of kraft paper for example, molded or folded into the desired shape. The rod 20 fits through an opening in the base of the cup 48, and carries a resilient insulating washer 50 which can be made of cork-filled resin or the like.

A convolutely wound capacitor section 51 fits over the rod 20 above the washer 50. Section 51 has an axial passageway 53 through which the rod 20 passes. A nut 55 holds the section in place, connector tab 57 being shown clamped under the nut for the purpose of making the desired electrical connections.

The section 51 is a conventional form of convolutely wound capacitor having two separate electrode foils each having one side margin projecting from a different side of the winding. The separate projections each make a convolutely wound electrode edge which is soldered together to improve conductivity. The soldered edge adjacent wall 12 is connected to that wall by means of a resilient conductive ring 59 which can be made of wire mesh or the like. The soldered edge on the opposite side of the winding is directly engaged with the connector tab 57.

Rod end 22 provides one terminal for the filter assembly, a second terminal being provided by a similar but shorter rod 62 similarly secured to but insulated from housing wall 13. The shorter rod 62, however, carries nothing but a connection tab 64 in addition to its insulator 63 which is similar to insulator 28.

Between section 51 and side wall 15 there is shown positioned two inductor units 65 and 66. Each unit is in the form of a toroidal winding 68 around a toroid core 70 insulated from the housing and from adjacent components as by means of dielectric liners 69 made of paper for example. As shown, the toroidal inductors 65 and 66 are connected in parallel with one common end lead to tab 57 and the other end to tab 64. Of course the inductor units 65 and 66 are not limited to toroidal construction but may be of solenoid form or any type of winding which exhibits self inductance.

On the opposite side of capacitor 51 and between it and housing wall 14 there is positioned a second capacitor 71 which can be a conventional convolutely wound assembly of foils and dielectric spacers, having a side margin of one foil projecting out on one edge of the windign and a margin of a second foil projecting out the other edge. For maximum compactness the capacitor 71 can be flattened, after or during the winding, into a rectangular cross-sectional shape. This will enable a larger capacitance to be fitted into the space between the flat wall 14 and the feed-through capacitor section 51. As with the feed-through capacitor 51, the turns of each projecting foil edge in capacitor 71 can be separately soldered together. One edge is then connected as by lead 73 to tab 64, the other edge connected by lead 75 to wall 12 of conductive housing 10. Lead 75 can be soldered directly to the housing wall, or it can be fitted under the head 77 of an attaching screw 79 which is in wall 12 and arranged to be threadedly engaged to a mounting structure upon which the entire assembly is to be fitted. A plurality of such mounting screws can be provided on this wall, or they can be arranged in any other convenient manner. The housing 10 can be covered as by a sheet metal cover plate 72 soldered all around the open top. For convenience the cover plate can have a turned in marginal flange to provide an improved joint.

Fig. 3 illustrates the electrical equivalent of the combination shown in Figs. 1 and 2. The feed-through capacitor 51 is here shown as connected between the housing (represented by the ground symbol) and one end of an inductor formed by a combination of units 65 and 66. Capacitor 71, which is not arranged to have a feed-through connection, is merely non-inductively connected between the housing (ground) and the other end of the inductor. The last mentioned end of the inductor is also connected to terminal 62.

The above combination operates in a very effective manner where current is supplied to terminal 62 and delivered by terminal 22 to the desired circuit. The connection can be reversed, however, and the combination will still operate very satisfactorily.

For improved operation the rod 20 as well as the rod 62 can be arranged so that they do not rotate with respect to the housing walls to which they are attached. For this purpose the housing aperture through wall 12 can be made non-circular and the bushing 28 made correspondingly non-circular so that it is keyed in position. Another non-circular engagement can be provided between the collar 24 and bushing 28 so that the collar will thereby be effectively held against rotation. Although a hexagonal opening and a hexagonal socket would be used in this modification of the construction shown in Fig. 2 for engaging hexagonal collar 24, these rotation-preventing engagements can be of any other non-circular configuration, either square, elliptical, or merely a circle with a single flat on it. Inasmuch as the most serious forces tending to rotate rod 20 or 62 are those directed clockwise looking at the rods from their exterior end, as for example when attempts are made to tighten the attaching nut on to the threaded end, the above type of keying connection will securely hold the assembly in place even when the collar 24 is merely threaded in place and not otherwise secured.

The compact assembly of the present invention can also be provided in other ways. Fig. 4 shows such a modified arrangement in which a single feed-through capacitor 51′ is combined with a single toroidal coil 83 and two supplemental capacitors 71′ and 87. This type of arrangement is suitable where the desired inductance is relatively low as compared to the capacitance.

Other alternative constructions pursuant to the present invention can have a single toroid used to occupy all the space between one side wall of the housing and the feed-through capacitor, the space on the opposite side of this capacitor being occupied by a supplemental capacitor such as that indicated at 71 in Fig. 1. The toroids of the present invention can be either perfectly circular around their central axis, or they can be square or even rectangular with respect to this axis. A rectangular form of toroid will more efficiently occupy the space provided on either side of the feed-through capacitor. Another suitable arrangement in accordance with the present invention could have a construction such as that shown in Fig. 1 with one of the toroids replaced by an additional supplemental capacitor so that two differently sized supplemental capacitors are provided along with one toroid.

The toroids as well as the supplemental capacitors, where more than one is used, can be connected either in parallel or in series, depending upon the particular conditions to be satisfied. Series connections are particularly useful where the units are to be subjected to high voltage.

In accordance with the present invention, a spacer ring for connecting the feed-through capacitor to the housing can be in the form shown in Fig. 5. Here the feed-through capacitor 51″ has its terminal adjacent the housing soldered to a metal ring 90 which forms the skirt of a compressed glass seal 92. The skirt has a shoulder 94 which can be soldered into an opening in the housing wall 12″. A bead 96 of compressed glass is held in the reduced portion of the skirt 90 and the bead in turn supports a tubular eyelet 98. The glass is placed under compression by selecting the composition of skirt 90 and eyelet 98 so that the bead can be melted between them and upon cooling, thermally induced forces will cause the members to supply considerable compression to the solidified glass.

The capacitor 51″ is shown in Fig. 5 as having a feed-through lead in the form of a thin, relatively flexible wire 100. In addition, a central tube of dielectric 102 within the capacitor 51″, made as by winding up a length of wider dielectric before the electrode portions of the capacitor are added to the winding, projects, as indicated at 104, into the skirt 90. Such an arrangement improves the insulation between the feed-through lead 100 and the soldered edge 95. The lead 100 can very simply be passed through tube 102 and eyelet 98, and can be soldered to the eyelet in such a way that the solder seals the eyelet shut. Before sealing, however, the opening of the eyelet 98 can be used as a convenient passageway for impregnating the capacitor 51″ as well as any other components that are positioned in the housing. The eyelet can also have an extending tab 106 to simplify its connection to an external circuit. The lead 100 shown as soldered or otherwise terminated with capacitor section 51″ continues therefrom as another lead or as the same conductor for connection to other components. It is to be realized of course that this terminal construction has application to other than the feed-through capacitor constructions.

Although a compressed glass seal is shown in Fig. 5, the seal can be built around a dielectric other than glass, and even where glass is used it can be kept free of any appreciable compression as by making the skirt 90 and eyelet 98 of material that has a thermal coefficient of expansion matching that of the glass. However, compressed glass seals are especially suited for constructions in which the metal immediately around the glass or within the glass, is soldered or otherwise subject to high temperature treatment such as welding, to the adjacent supporting structure.

The various constructions can be impregnated before or after assembly. An aperture can, for example, be provided in the cover 72 so that after the cover is soldered in place, the unit can be impregnated through this aperture, and the aperture then sealed shut as by solder. Impregnants can be of any desired type such as mineral oil, castor oil, chlorinated diphenyl, chlorinated naphthalene, polybutadiene, etc. The impregnant can either be arranged to remain liquid, or to become gelled or solidified, and the solidification can be purely physical or can be the result of a polymerization or cross-linking action. Mineral oil can, for example, have dissolved in it 20% of polyethylene (molecular weight 2,100) by weight and the resulting solution used for impregnation at a temperature of about 100° C. Upon cooling the impregnant will become gelled and will show no tendency to leak out.

Different types of feed-through capacitors can be used in accordance with the present invention. Instead of having two foils, each projecting beyond one edge of the winding, one of the foils can be wider than the other and project from both ends of the housing as shown, for example in the Beverly Patent No. 2,526,321. Other suitable feed-through capacitors are shown in Beverly Patents Nos. 2,440.652 and 2,552,306. With some of these alternative constructions both edges of the capacitor are insulated from the housing so that the conductive spacer ring 59 or equivalent will not be needed.

As many apparently widely different embodiments of this invention may be made without departing from the spirit and scope hereof, it is to be understood that the invention is not limited to the specific embodiments hereof except as defined in the appended claim.

What is claimed is:

A compact filter construction comprising a generally rectangular conductive housing having a pair of substantially planar end walls and at least one pair of opposed side walls, a terminal insulated from and passing through each of said end walls, a convolutely wound extended-foil capacitor having the extended foils joined at each end to provide a pair of opposed contact areas, a feed-through conductor having one end connected to one of said terminals and disposed between said end walls, said conductor having a second end connected to one of said contact areas and passing through the center of said convolutely wound capacitor, one end of an elongated ring-shaped conductive member connected between the other of said contact areas and one of said end walls and surrounding said one of said terminals and said one end of said feed-through conductor, means secured to said second end of said feed-through conductor for urging said capacitor into engagement with said ring-shaped conductive member, a flattened second convolutely wound capacitor of a length such as to extend from approximately one end wall to the other end wall, said second capacitor mounted in said housing parallel to and between the first-mentioned capacitor and one of said pair of side walls with said flattened surfaces contiguous thereto, said second capacitor being disposed immediately adjacent said one of said pair of side walls, a toroidal core having inductance windings thereon disposed in spaced relationship to the first-mentioned capacitor and between the first-mentioned capacitor and the other of said pair of side walls, said toroidal coil lying immediately adjacent said other of said pair of side walls, said second capacitor and said inductor windings connected to said terminals and said housing so as to provide a conventional filter circuit therebetween.

References Cited in the file of this patent

UNITED STATES PATENTS

| | | |
|---|---|---|
| 1,684,703 | Houck | Sept. 18, 1928 |
| 2,346,162 | Hanopol | Apr. 11, 1944 |
| 2,388,054 | Hartzell | Oct. 30, 1945 |
| 2,552,306 | Beverly | May 8, 1951 |

FOREIGN PATENTS

| | | |
|---|---|---|
| 677,932 | Great Britain | Aug. 27, 1952 |